Dec. 28, 1965    J. D. KELLER    3,225,757
RADIANT TUBE HEATERS
Filed Nov. 9, 1962
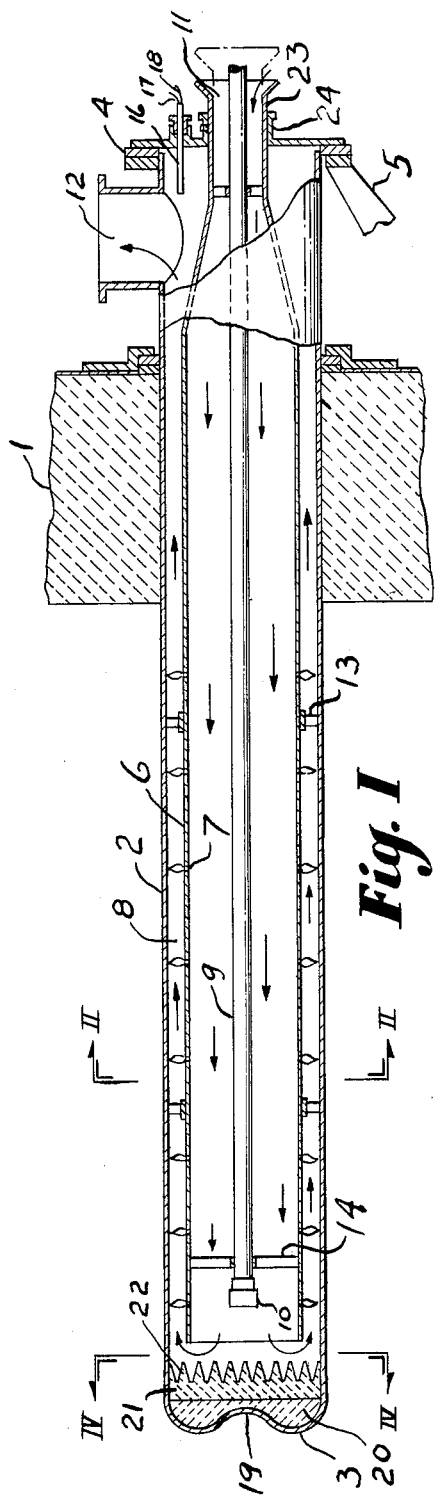
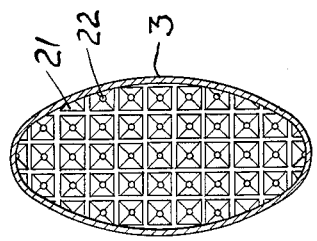
Fig. IV
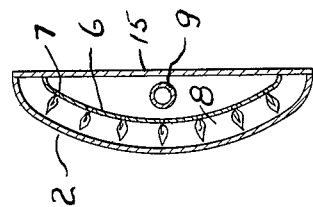
Fig. III
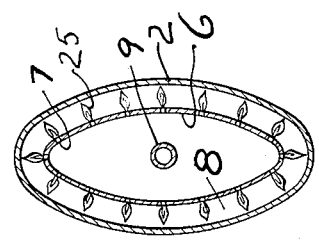
Fig. II
Fig. I
INVENTOR.
John D. Keller
BY William B. Jaspert
Attorney.

United States Patent Office 3,225,757
Patented Dec. 28, 1965

3,225,757
RADIANT TUBE HEATERS
John D. Keller, Pittsburgh, Pa., assignor to Hazen Engineering Company, Pittsburgh, Pa., a corporation of Pennsylvania
Filed Nov. 9, 1962, Ser. No. 236,550
1 Claim. (Cl. 126—91)

This invention relates to new and useful improvements in radiant heating units and it is among the objects thereof to provide radiant heating units in which a tube-type housing closed at one end is employed as a combustion chamber to which fuel and air are delivered by tubes extending centrally throughout the longitudinal extent of said heaters, the present invention dealing with the use of a radiant of ceramic or refractory material at the end of the tube-like housing to maintain an incandescence conducive to the continuous propagation or maintenance of a combustion flame.

It is further object of the invention to provide a radiant heating unit of the above-designated character in which the air tube is movable in an axial direction to produce a desired longitudinal spacing of the primary air nozzle or open end of the air tube in relation to the closed end of the combustion chamber to adjust the ratio of primary air issuing with the fuel from the end of the air tube, to the secondary air issuing from the small holes in the wall of the air tube.

It is a further object of the invention to provide a radiant heating unit of a tube-like construction in which the space between the wall of the outer tube and the wall of the air inner tube constitutes a combustion chamber in which said walls are nearly uniformly spaced apart to provide the approximately same distance for propagation of the small flames issuing from holes in the wall of the air tube.

These and other objects of the invention will become more apparent from a consideration of the accompanying drawings constituting a part hereof in which like reference characters designate like parts and which consist of:

FIGURE 1 a cross-sectional view, partially in elevation, of a radiant heater employing a refractory element or radiant at the end of the air and gas tube;
FIGURE 2 a cross-sectional view taken along the line 2—2 of FIGURE 1;
FIGURE 3 a cross-sectional view showing a modification of the radiant tube heater of FIGURES 1 and 2; and
FIGURE 4 a cross-sectional view taken along the line 4—4 of FIGURE 1.

With reference to FIGURES 1 to 4 of the drawing, the numeral 1 designates a wall of a heating chamber in which is mounted a tube-type housing 2 shown in cross section in FIGURE 2 as an oval-shaped member with closed end 3 and a flanged element 4 that abuts a bracket member 5 at the other end.

As shown in FIGURE 2, the housing 2 is of oval shape and disposed within the housing is a complementary shaped air tube 6 having a series of perforations 7 by which air is introduced into the space 8 between the outer housing 2 and the air tube 6, which space constitutes the combustion chamber. Disposed within the air tube 6 is a gaseous fuel tube 9 having a burner element nozzle generally designated by the numeral 10, FIGURE 1, at the end thereof. The air tube 6 is provided with a funnel-shaped open end 11 for drawing in air and the housing 2 is provided with an opening 12 for exhausting the products of combustion from the combustion chamber 8. Spider brackets 13, FIGURE 1, slidable within 2, hold the air tube 6 in spaced relation to the housing or outer tube 2 while spider brackets 14 hold the fuel tube 9 in spaced relation to air tube 6.

In FIGURE 3, the outer housing 2 and the air tube 6 are of semi-eliptical or oval shape, an outer wall 15, which may be of a flat shape, being provided, such a construction being desirable where it is desired to heat an article exposed in a heating chamber from one side only. Wall 13 is not necessarily flat, but may be bowed outward to make the air passage of oval shape and to provide more space for fuel tube 9.

The numeral 16 designates a conduit for holding wires 17 and 18 leading to a spark plug (not shown) for igniting the fuel in the combustion chamber 8. It is further apparent that the housing 2 and air tube 6 may be round and maintain a uniform combustion space between them.

With reference to FIGURE 1 of the drawing, the end of the burner housing 2 is shown as having a re-entrant portion 19 in which is disposed a refractory mortar or cement 20 and mounted on the latter is a radiant element 21 of a refractory material having a rough surface, the roughness of which may be increased by, for example, the teeth or serrations 22, the end view of which is shown in FIGURE 4, which become incandescent from the flame propagated adjacent thereto and in contact therewith.

Preferably the refractory material 21 is of the kind called "light-weight refractory," weighing not more than about 70 pounds to the cubic foot and having low thermal conductivity, enabling it to heat up to incandescence rapidly. At least that portion of the refractory exposed to the flame should have a fine-grained porosity and preferably should contain a considerable proportion of kaolin which aids the incandescence and the combustion.

The end of housing 2 need not have the re-entrant shape shown in FIGURE 1 but may be flat or of other shape. Instead of being held in place by cement 20, the refractory element 21 may be held in place by other means, for example, by set-screws through the outer tube 2, or it may be cast in place if a "castable" refractory is used.

The numeral 14 designates a spider bracket for maintaining proper space relation of the gaseous fuel tube 9 to the air tube 6.

As shown in FIGURE 1, the air inlet end 11 of tube 6 is provided with a cylindrical neck portion 23 that slides in a packing gland 24 when tube 6 is adjusted relative to the closed end 3 of the housing 2.

The operation of the above-described burners is briefly as follows:

With reference to FIGURE 1, the gas supplied through tube 9 enters into the enlarged nozzle portion or burner tip 10 to propagate the flame in the chamber 8 with which the flame retaining orifices 7 communicate, as shown. The gases passing through chamber 8 draw in a little air from the air tube 6 and a flame is ignited which is not blown out by the velocity of the air flow in tube 6, being protected therefrom by the outer wall of chamber 8. There is, however, sufficient air entering the enlarged nozzle portion 10 through small orifices, not shown, to support combustion of a small portion of the fuel in the small chamber formed by the nozzle portion 10. The unburnt bulk of the gaseous fuel passes out from the fuel pipe 9 through nozzle 10 and around the end of the air tube 7, as shown by arrows, into the combustion chamber 8 through which it travels over the perforations 7 from which preheated air under pressure is injected into the fuel, ignition taking place only when a proper mixture of fuel and air exists, which is at any one of the air jets extending into the combustion chamber. Once the gaseous air mixture is ignited, the proper amount of fuel and primary air fed into the combustion chamber can be regulated by moving the air tube 6 back and forth, as shown in FIGURE 1, and when the gas and air cause combustion in the chamber 8 between the outer housing and the air tube 6, the radiant element 21 and the roughened surface 22 thereof being incandescent will sustain the ignition of the gas and air at the end of the tubes and into the combustion chamber 8.

The unburned fuel mixture will pass from the closed end around the air tube 6 as shown by arrows and will burn in the presence of secondary air from the air tube 6 through the orifices 7. This secondary air produces a series of flames the length of which is determined by the size of the orifices 7 and the velocity of the air flow.

With reference to FIGURE 2 of the drawing, it will be noted that the combustion chamber 8 is of nearly uniform cross section because of the complementary shapes of the housing 2 and the air tube 6. The reason for this is that this uniform space or distance between the outside of tube 6 and the inside of tube 2 provides the same distance for the flame which may be designated by the numeral 25.

Preferably I make the spacing of the orifices 7 around the perimeter of air tube 6 somewhat closer together than the average near the minor axis of the oval or the flattened sides of the tube, and farther apart than the average near the major axis of the oval or the rounded ends of the tube cross-section, referring to FIGURE 2. The purpose of this is to furnish relatively more air and develop more heat at those portions of the outer tube perimeter which can radiate most freely and develop less heat at those portions from which the outward radiation is somewhat obstructed by the presence of adjacent tubes located as shown in FIGURE 2. By this means, the temperature of the metal is made more uniform around the perimeter of tube 2, thereby reducing localized overheating. To the same end, I preferably stagger the spacing of alternate circumferential rows of the orifices 7 along the length of the tube.

I have discovered that the proper opening or size of the orifice 7 should be approximately .077 times the average distance from the outside of air tube 6 to the inside of outer tube 2. This is the preferred condition, although this proportioning of orifice size and distance may be varied without altering the principle of operation of the burner. In the type of burner shown in FIGURE 3, the wall 15, shown flat, is not perforated and the flame is propagated only on the curved wall of the air tube 6 facing outer tube 2.

In operation the flames 25 are of an intense heat transmitting capacity and cause the outer housing 2, against which they impinge and to which they impart heat by convection or contact, by radiation, and by catalytic action, to become uniformly hot along the length of said outer tube, thereby to increase its radiating efficiency to supply heat to a heating chamber in which the radiant tubes are disposed or against a metal piece or strip that is to be annealed by the use of a series of such radiant tubes.

By means of the radiants 21 with their rough surface or teeth 22, an incandescent condition is maintained at the end of the radiant tube to sustain combustion throughout the usual operation of the heating element.

Although one embodiment of the invention has been herein illustrated and described, it will be evident to those skilled in the art that various modifications may be made in the details of construction without departing from the principles herein set forth.

I claim:

In a radiant tube heater an outer housing of tubular construction having a closed end and having a passage for exhausting the products of combustion adjacent the other end thereof, a tubular shaped member of substantially the same shape as said outer housing disposed therein and spaced therefrom to form a combustion chamber therebetween extending substantially the effective length of said heater, said last named tubular member having openings in the wall to supply jets of air at spaced intervals throughout the length of the combustion chamber to support combustion of the fuel and air mixture passing from the closed end to the exhaust passage of the combustion chamber, a fuel supply tube disposed within said air tube having a burner tip adjacent the closed end of the housing, and a radiant at the closed end of the housing opposite the burner tip to support combustion of a small portion of the fuel adjacent said radiant, said air tube being mounted to be axially movable within the combustion housing to regulate the proper amount of fuel and primary air fed into the combustion chamber at the closed end of the combustion chamber.

References Cited by the Examiner

UNITED STATES PATENTS

| 1,751,533 | 4/1930 | Taylor. | |
| 2,041,312 | 5/1936 | Winder et al. | 126—91 |
| 2,051,099 | 8/1936 | Mumford | 126—91 |
| 2,415,223 | 2/1947 | Stangle | 126—92 |
| 2,479,042 | 8/1949 | Gaines. | |
| 2,602,440 | 7/1952 | Corns | 126—91 |

FOREIGN PATENTS

| 208,905 | 5/1960 | Austria. |
| 502,112 | 3/1939 | Great Britain. |
| 539,657 | 7/1941 | Great Britain. |

FREDERICK KETTERER, *Primary Examiner.*

JAMES W. WESTHAVER, *Examiner.*

FREDERICK L. MATTESON, JR., *Assistant Examiner.*